United States Patent
Kohan

(12) 
(10) Patent No.: US 6,954,577 B2
(45) Date of Patent: Oct. 11, 2005

(54) SYSTEM AND DEVICES FOR ROUTING AND MANAGING DATA CABLES FROM A TELECOMMUNICATIONS ENCLOSURE

(75) Inventor: Kamran Kohan, Orange, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 0 days.

(21) Appl. No.: 10/626,933

(22) Filed: Jul. 25, 2003

(65) Prior Publication Data

US 2005/0018991 A1 Jan. 27, 2005

(51) Int. Cl.⁷ .................................................. G02B 6/00
(52) U.S. Cl. ..................................................... 385/135
(58) Field of Search ................................. 385/132–135

(56) References Cited

U.S. PATENT DOCUMENTS

| | | |
|---|---|---|
| 6,824,312 B2 | 11/2004 | McClellan |
| 2003/0095772 A1 * | 5/2003 | Solheid et al. .............. 385/134 |
| 2004/0227534 A1 * | 11/2004 | Mueller ...................... 324/758 |

* cited by examiner

Primary Examiner—J. F. Duverne
(74) Attorney, Agent, or Firm—Fogg and Associates, LLC; Scott V. Lundberg

(57) ABSTRACT

A system for managing and routing one or more data cables is disclosed. This system comprises a telecommunications enclosure and a cable routing station. The telecommunications enclosure has an external surface that houses at least one data cable. The cable routing station is coupled to the external surface of the telecommunications enclosure and is adapted to selectively route one or more of data cables away from the telecommunications enclosure.

62 Claims, 8 Drawing Sheets

SYSTEM AND DEVICES FOR ROUTING AND MANAGING DATA CABLES FROM A TELECOMMUNICATIONS ENCLOSURE

TECHNICAL FIELD

The present invention relates generally to the field of telecommunications, and, in particular, to cable routing management systems for a telecommunication chassis.

BACKGROUND

Telecommunication chassis store and organize a variety of telecommunication line cards and other equipment. A chassis often contain numerous communication links from the separate line cards that are coupled to other chassis, the backplane, other line cards, remote locations and the like. Managing the numerous links is cumbersome in preventing the links from damage or kinks that can disturb data transmission becomes difficult as it travels from the chassis to other locations or within the chassis. Often the chassis contains line cards with optical fibers. These optical fibers require bends in the fibers to curve within a certain bend radius to ensure the strength and integrity of the optical signals.

In previous telecommunication chassis, management of multiple fibers faced two problems. The first is managing the multiple fibers so that the bend radius of the fiber is within standards for minimum data loss of optical fibers. The second problem is managing cables around a system that contained sharp edges and corners that could injure the technician and chafe the fiber casing. Damaging the fiber casing can cause optical signals to be lost or distorted resulting in technicians to be deployed for repair work.

For the reasons stated above, and for other reasons stated below which will become apparent to those skilled in the art upon reading and understanding the present specification, there is a need in the telecommunications industry for a safe and effective method of routing data cables from telecommunication chassis.

SUMMARY

The above-mentioned problems of managing and routing multiple data cables within the standard bend radius of optical fibers and other problems are resolved by the present invention and will be understood by reading and studying the following specification.

In one embodiment, a system for managing and routing one or more data cables is disclosed. This system comprises a telecommunications enclosure and a cable routing station. The telecommunications enclosure has an external surface that houses at least one data cable. The cable routing station is coupled to the external surface of the telecommunications enclosure and is adapted to selectively route the one or more of data cable away from the telecommunications enclosure.

In another embodiment, a cable routing station for managing and routing one or more data cables is disclosed. The cable routing station comprises a rear face, a bottom plate and a plurality of cable routing clips. The rear face has a front surface and a first edge extending along the length of the front surface. The bottom plate extends from the first edge of the rear face. The plurality of cable routing clips are coupled to the front surface of the rear face and are adapted to route the data cables in a select direction.

In still another embodiment, another cable routing station for managing and routing one or more data cables is disclosed. The cable routing station comprises a mounting plate, at least one long cable routing clip and at least one eyebrow. The mounting plate has a front surface and a first edge extending along the length of the front surface. Each long cable routing clip is coupled to the front surface of the mounting plate and is adapted to guide data cables into the cable routing system. Each eyebrow has an engaging surface that has a select radius along a length of the engaging surface and is coupled to the front surface of the mounting plate. Data cables abut to the eyebrows to conform to the bend radiuses of the eyebrow.

In yet another embodiment, another cable routing station for managing and routing one or more data cables is disclosed. The cable routing station comprises: a mounting plate, a bottom plate, at least one hook, at least one cable hinge holder. The mounting plate has a front surface and a first and second edge. The bottom plate is coupled to the mounting plate extending along the length of the front surface approximately along the first edge. Each hook is coupled to the front surface of the mounting plate approximately along the second edge of the mounting plate. Each cable hinge holder is coupled to the bottom plate. Also, each closed cable hinge holder and each hook is adapted to route data cables in a select direction.

In further another embodiment, method of managing data cables in a telecommunication system is disclosed. This method comprises routing data cables housed in a telecommunication chassis out of the chassis. This method also comprises routing data cables that were routed out of the chassis into a cable routing station attached to the chassis.

BRIEF DESCRIPTION OF THE DRAWINGS

The present invention can be more easily understood and further advantages and uses thereof more readily apparent, when considered in view of the description of the preferred embodiments and the following figures in which.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide a system of managing and routing data cables such as telecommunication data cables and the like. Some embodiments of the present invention provide a method and system of managing and routing telecommunication data cables such that the bend radius of the cable is within standards for minimum data loss of optical fibers. Moreover, some embodiments of the present invention provide a method and system of managing cables without exposure to sharp edges and corners that could injure the technician and chafe the cable casing.

Figure 1:
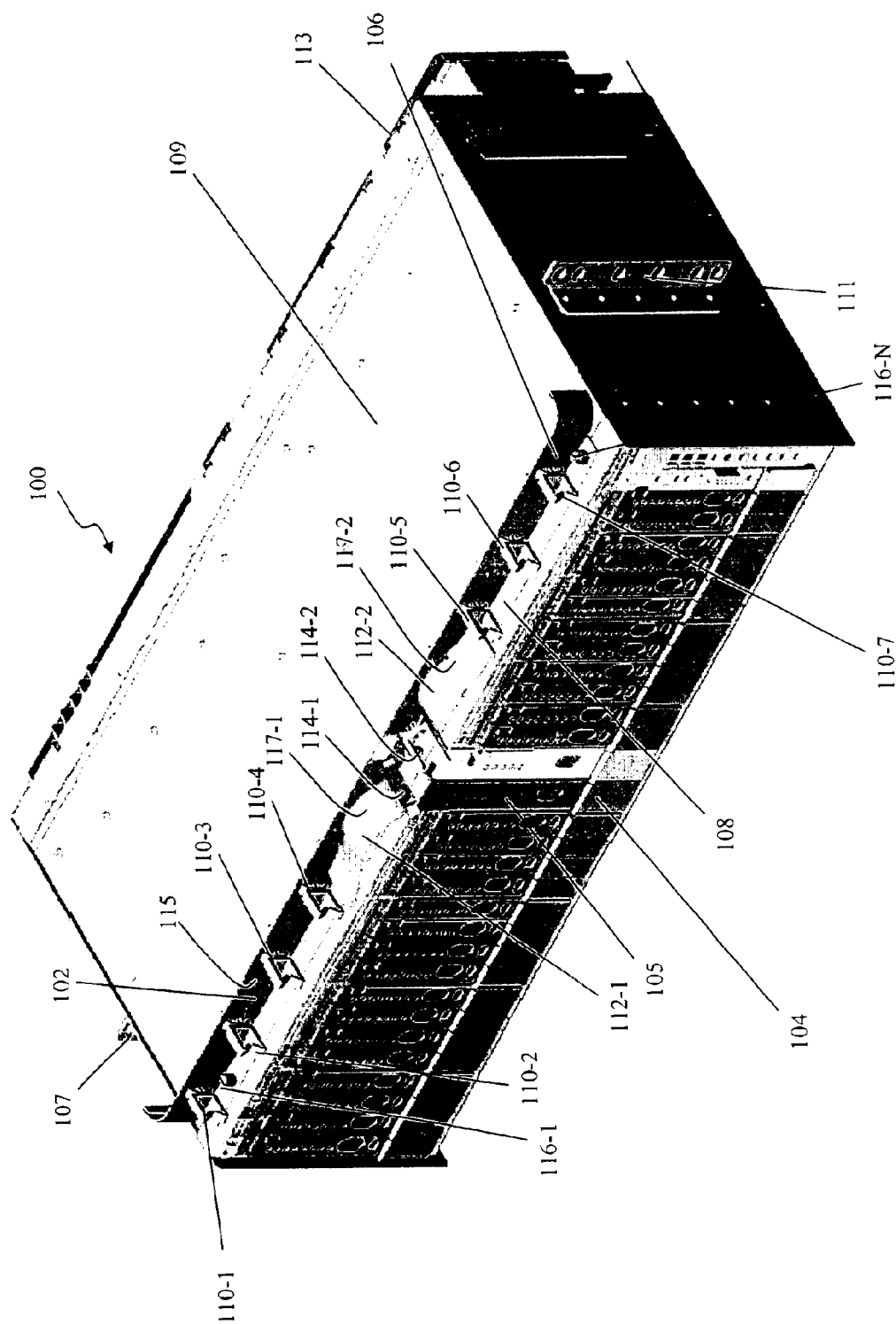
FIG. 1 is a perspective view of a first embodiment of a data cable routing telecommunications system.

FIG. 1 is an illustration of a first embodiment of a data cable routing telecommunications system generally shown at 100 according to the teachings of the present invention. System 100 includes cable routing station 102 attached to an external surface of telecommunications chassis 104 by one or more fasteners 116-1 to 116-N. Telecommunications chassis 104 has a front end 105, a back end 113, a top end 109, a left end 107 and a right end 111. In this embodiment cable routing station 102 is coupled to the top end 109 and approximately adjacent to the front end 105 of the telecommunications chassis 103. Cable routing station 102 of this embodiment includes a rear face 106 perpendicularly attached to bottom plate 108. As illustrated in FIG. 1, in this embodiment the cable routing clips 110-1 to 110-N are attached to a front surface 115 of the rear face 106. Also attached to rear face 106 are eyebrows 112-1 and 112-2 and two long cable routing clips 114-1 and 114-2. Moreover, also attached to bottom plate 108 are fasteners 116-1 to 116-N.

In operation, one or more communication cables (not shown) are routed from the front end 105 of chassis 100 between long cable routing clips 114-1 and 114-2. Some of the cables are routed through long cable routing clip 114-1 and the other of the cables are routed through 114-2. A section of the cables abut the respective eyebrows 112-1 and 112-2 conforming to the bend radius of an engaging surface 117-1 and 117-2 of an associated eyebrow 112-1 and 112-2. In other embodiments, the entire cable abut its respective eyebrow. The cables are then routed through the respective routing clips 110-1 through 110-7.

Figure 2A:
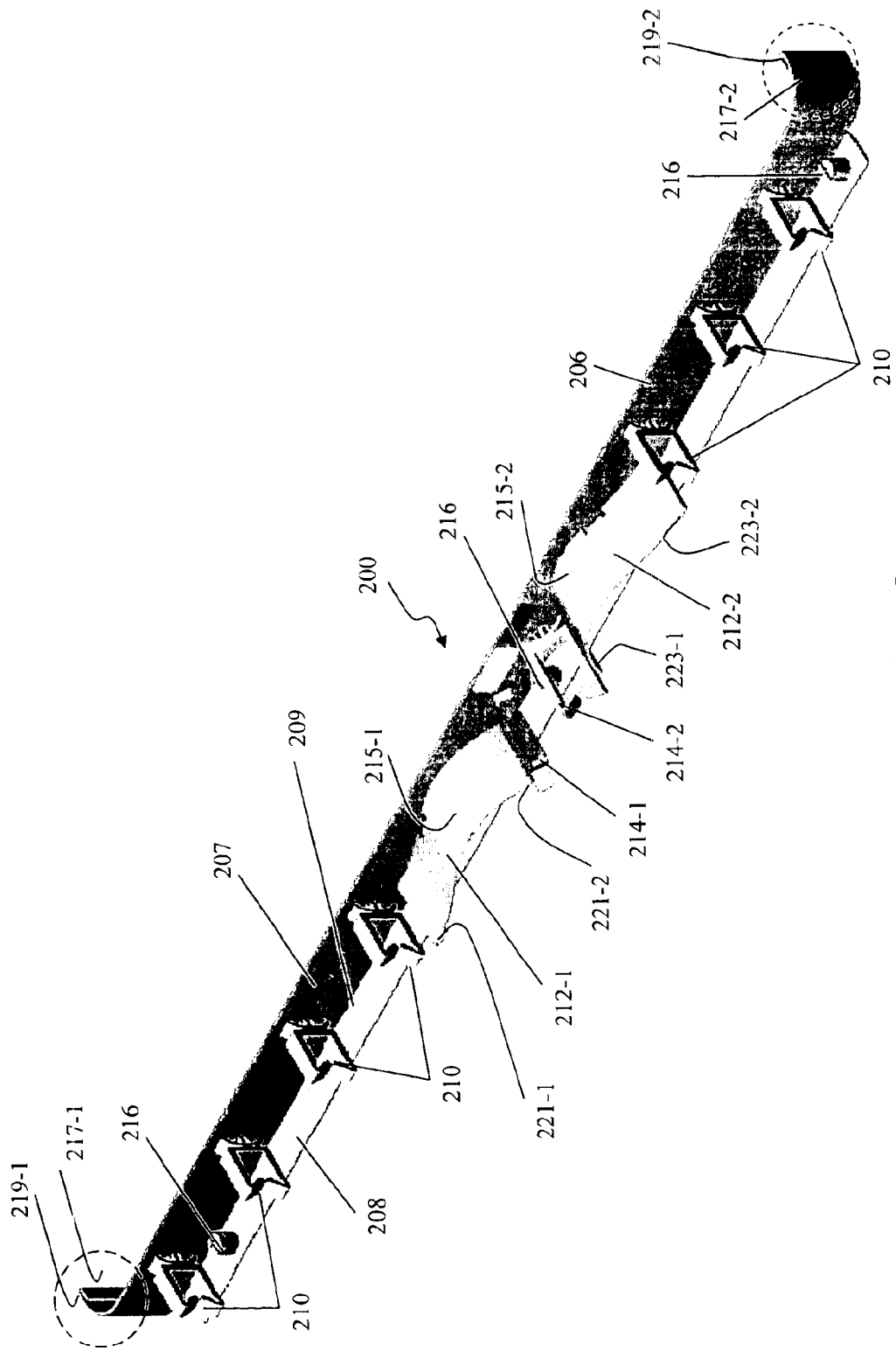
FIG. 2a is a perspective view of one embodiment of a cable routing station.
Figure 2B:
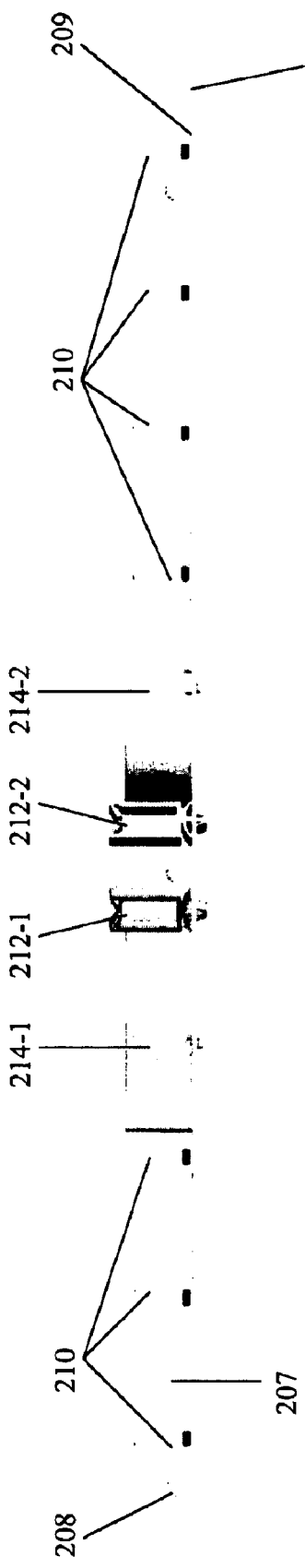
FIG. 2b is a top view of one embodiment of a cable routing station.
Figure 2C:
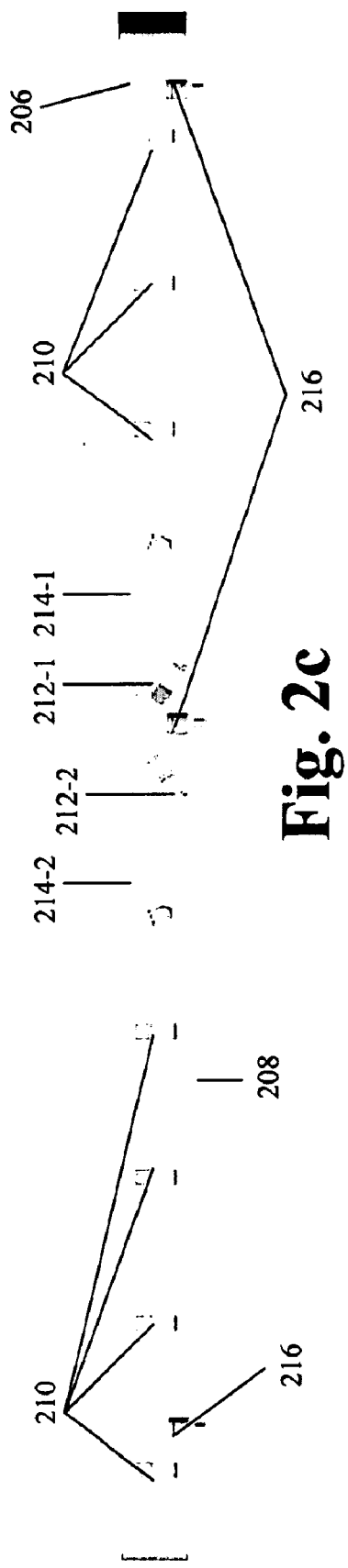
FIG. 2c is a front view of one embodiment of a cable routing station.
Figure 2D:
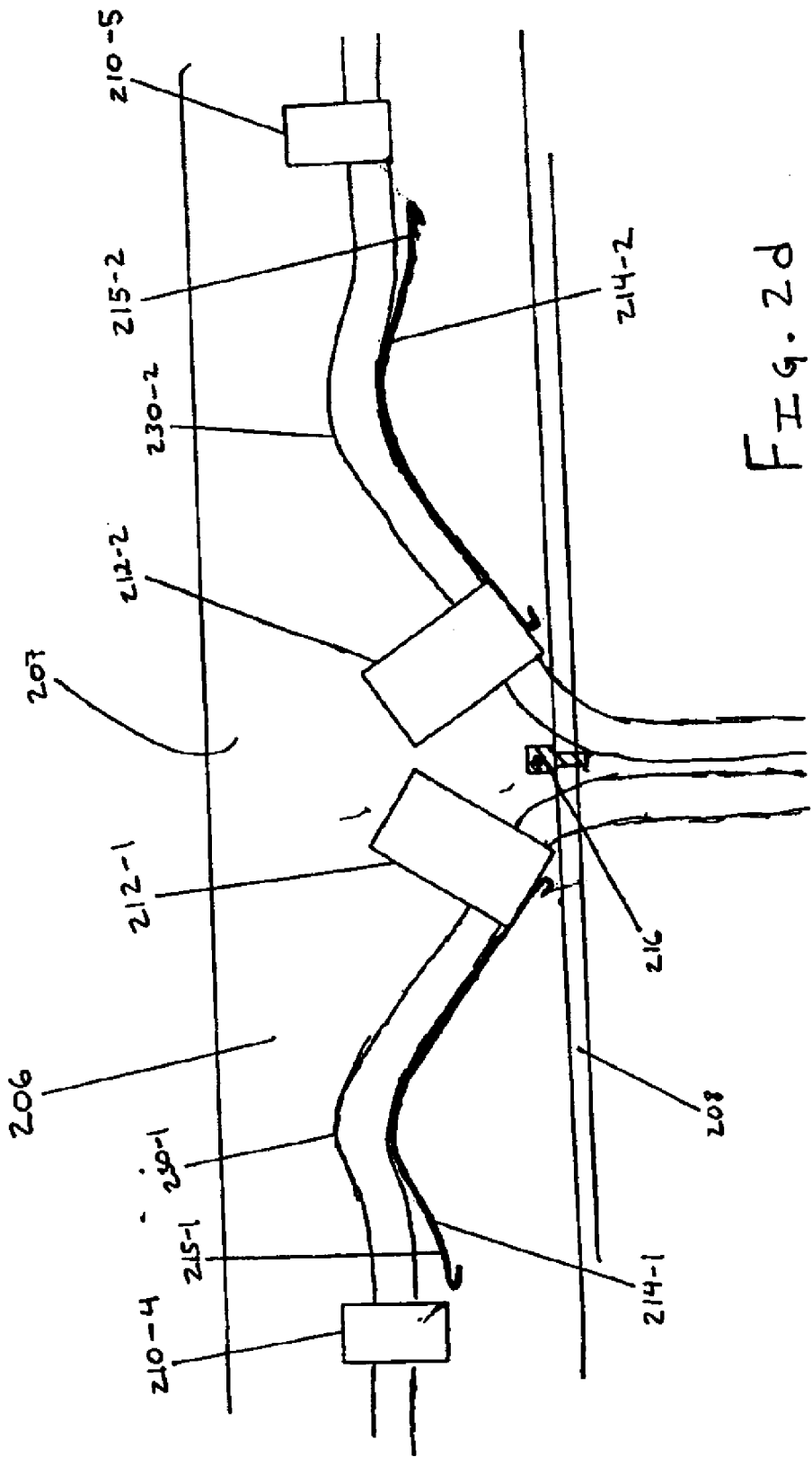
FIG. 2d is an exploded view of a section of a cable routing station of one embodiment of the present invention.

FIGS. 2a, b, and c are illustrations of one embodiment of a cable routing station 200 similar to the cable routing station 100 shown in FIG. 1. Cable routing station 200 includes a rear face 206. Rear face 206 includes a front surface 207 and a first edge 209. Cable routing station 200 also includes a bottom plate 208 that is coupled to the rear face 206. Moreover, as illustrated in this embodiment the bottom plate 208 extends from the first edge 209 of the rear face at a select angle from the front surface 207. In this embodiment cable routing clips 210 are attached to rear face 206. The cable routing clips are positioned a select distance from each other. Also attached to rear face 206 are eyebrows 212-1 and 212-2 and two long cable routing clips 214-1 and 214-2. Further, attached to bottom plate 208 are fasteners 216. The fasteners 216 are used to attach the cable routing station to an enclosure that houses data cables. In other embodiments, more or less numbers of cable routing clips, eyebrows and long cable routing clips are used. FIG. 2d is an exploded view of a section of a cable routing station 200 of one embodiment of the present invention that illustrates the routing of data cables 230-1 and 230-2 through long routing clips 214-1 and 214-2 and eyebrows 212-1 and 212-2. As illustrated, a section of each data cable 230-1 and 230-2 conform to the radial bend of their associated eyebrow 212-1 and 212-2. Although, this embodiment is illustrated as routing two data cables, it will be understood in the art that other numbers of data cables can be routed and that the present invention is not limited to routing only two data cables.

In one embodiment the combination of long cable routing clips 214-1 and 214-2 between two eyebrows 204-1 and 204-2 is located an approximate the center of the cable routing station 200. In other embodiments this combination is not placed in the center of the cable routing station 200. An example of this embodiment is illustrated in FIG. 2a. The long cable routing clips 214-1 and 214-2 are longer than cable routing clips 210 to allow the cable to abut to the eyebrows 204-1 and 204-2. With this arrangement, a data cable routed through an associated long routing clip 214-1 or 214-2 will bend across an engagement surface 215-1 on 215-2 of an associated eyebrow 204-1 and 204-2. Each engagement surface 215-1 and 215-2 of each eyebrow 204-1 and 204-2 has a select bend radius along its length. In one embodiment the bend radius is the standard bend radius of optical fibers without slipping. In another embodiment the bend radius is approximately 1 and ¼ inches. In one embodiment, cable routing clips 210 rotate around an axis perpendicular to rear face 206. This allows flexibility for the cables to travel through the routing system without bending the cable past the standard bend radius of optical fibers.

Rear face 206 curves back on both ends 217-1 and 217-2 and hems at the exposed edges 219-1 and 219-2. For example, see the circled portion in FIG. 2. The curvature at both ends 217-1 and 217-2 of rear face 206 in one embodiment allows cables to be managed to the back end of a telecommunications chassis and on to telecommunication racks or the like. Eyebrows 204-1 and 204-2 also hem at the ends 221-1, 221-2, 223-1 and 223-2. These hems prevent sharp edges from contacting the cables as well as protect workers placing the cables through cable routing system 200 from sharp edges.

Figure 3A:
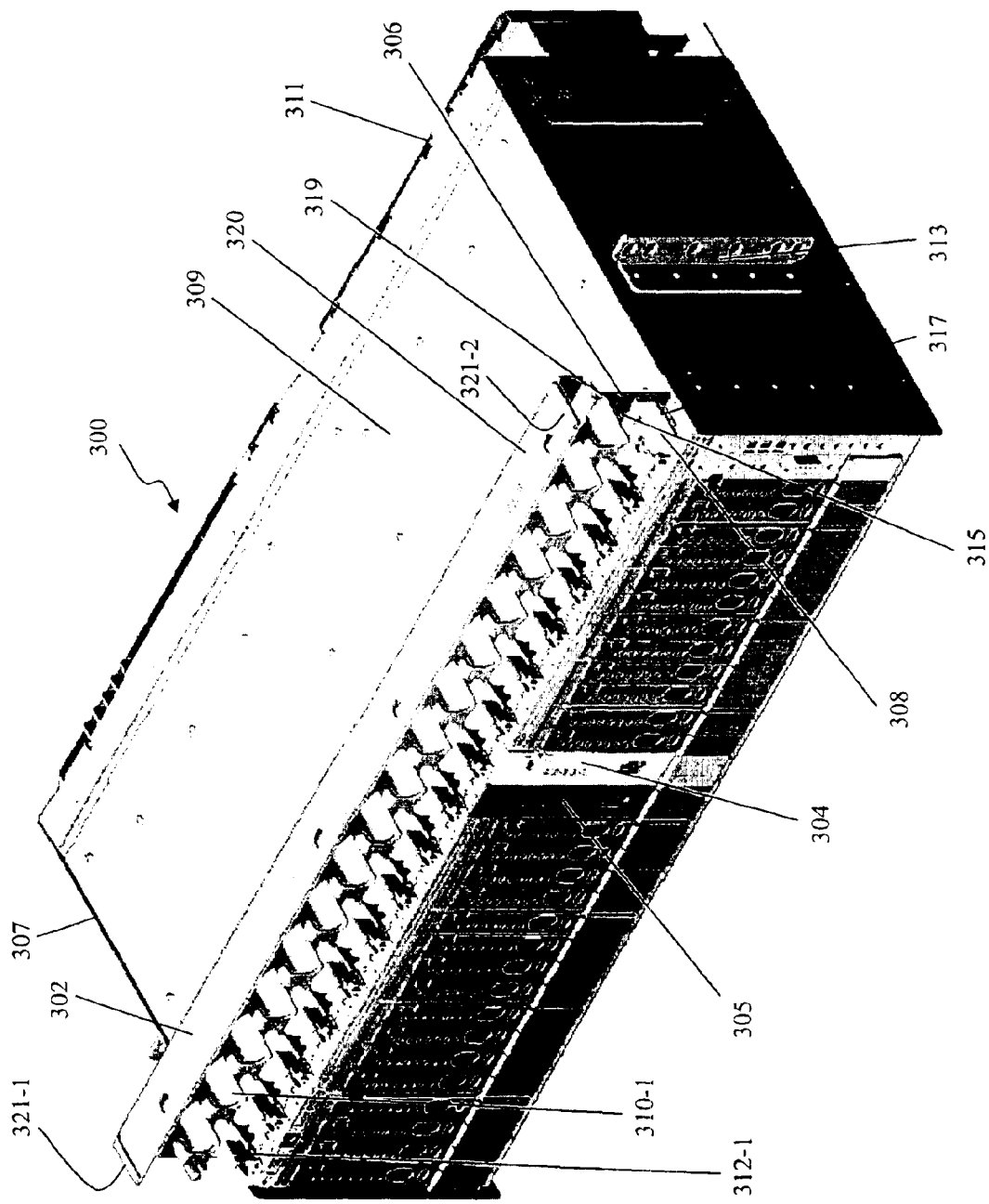
FIG. 3a is a perspective view of one embodiment of a cable routing station.
Figure 3B:
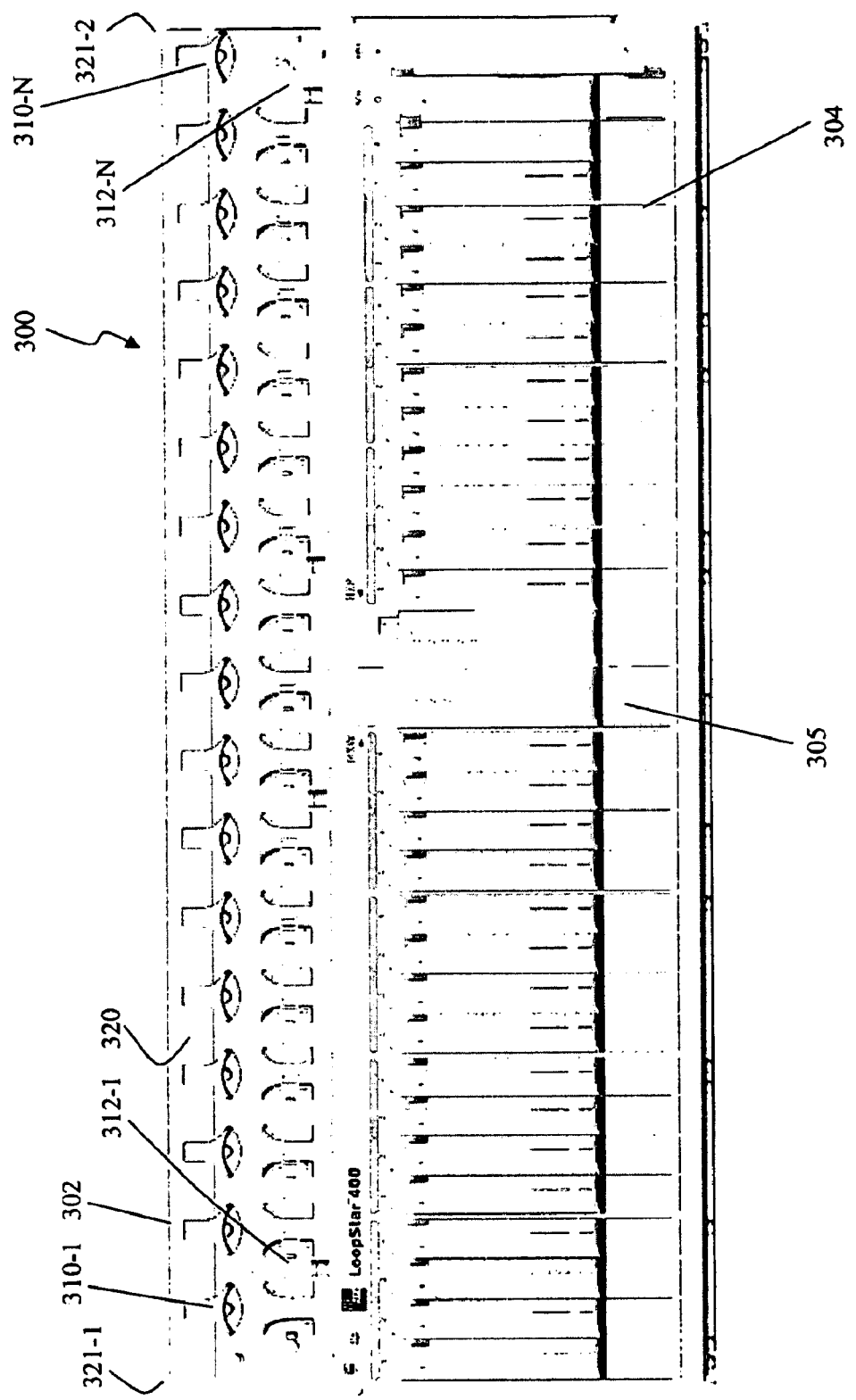
FIG. 3b is a front view of one embodiment of a cable routing station.

FIGS. 3a and 3b are illustrations of another embodiment of a cable routing telecommunications system generally shown at 300 according to the teachings of the present invention. System 300 includes cable routing station 302 attached to telecommunications chassis 304. Telecommunications chassis 304 has a front end 305, a back end 311, a top end 309, a left end 307 and a right end 313. Cable routing station 302 includes a bottom plate 308 and a rear face or mounting plate 306. Mounting plate 306 has a front surface 315, a first edge 317 and a second edge 319. Bottom plate 308 is coupled to the mounting plate 306 extending along the length of the front surface 315 approximate the first edge 317. In one embodiment, hooks 310-1 to 310-N are attached consecutively to front surface 315 of mounting plate 306. Attached consecutively to bottom plate 308 are cable hinge holders 312-1 to 312-N. Cable tunnel 320 is coupled to the second edge 319 of the mounting plate 306.

In operation, one or more communication links (or communication cables) are routed up from the front end of chassis 305 and into cable hinge holders 312-1 to 312-N. Each cable is then further routed up and around hooks 310-1 to 310-N. In one embodiment, each of the hooks 310-1 to 310-N is vertically positioned to the left or right of their associated cable hinges 312-1 to 312-N. Cables are then routed through cable tunnel 320 to a respective end 321-1 or 321-2 of cable routing station 302, then cables are to be managed to the back end of a telecommunications chassis and on to telecommunication racks or the like.

Figure 4:
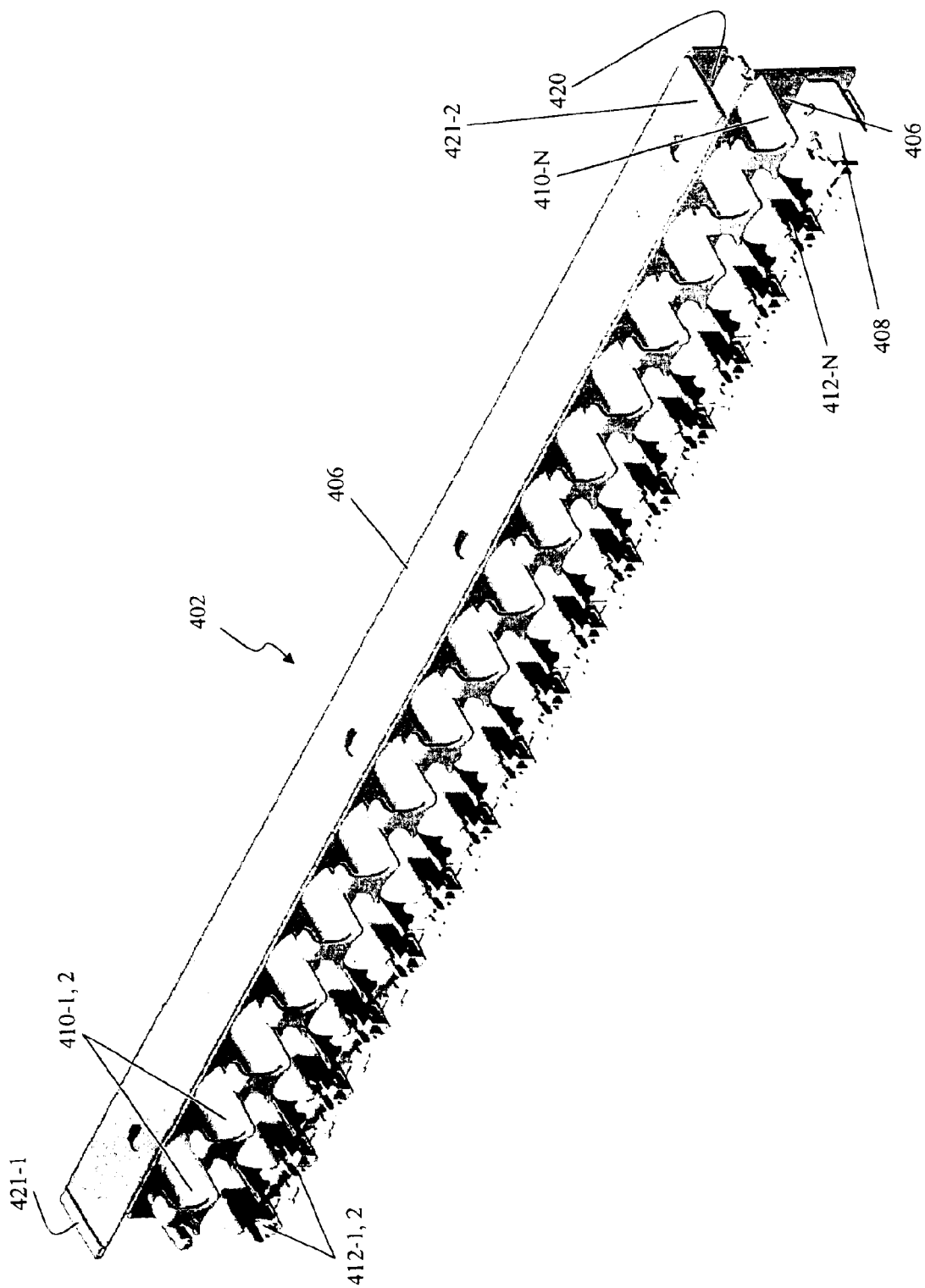
FIG. 4 is a perspective view of one embodiment of the present invention.

FIG. 4 is an illustration of an embodiment of a cable routing station similar to the cable routing station shown in FIGS. 3a and b. Cable routing station 402 includes a bottom plate 408 attached to mounting plate 406. Attached to mounting plate 406 is cable tunnel 420. Also attached to mounting plate 406 are hooks 410-1 to 410-N. bottom plate 408 has cable hinge holders 412-1 to 412-N.

In operation, one or more data cables are routed through cable hinge holders 412-1 to 412-N. The cable hinge holders prevent the cable from moving out of path and becoming kinked, allowing for easier management of the cables. Each cable would then be routed around associated hooks 410-1 to 410-N. As illustrated in FIG. 3b, in this embodiment, each hook 410-1 to 410-N is stationed vertically to the left or right of cable hinge holders 412-1 to 412-N. This arrangement allows cables to bend around the hook within a certain bend radius of an optical fiber. This ensures the strength and integrity of the optical signals in optical fibers. Cables are then routed through cable tunnel 420 to the ends 421-1 or 421-2 of cable routing station 402. The cables can then to be managed to the back end of a telecommunications chassis and on to telecommunication racks or the like. Similar to the other described embodiments the ends 421-1 and 421-2 are hemmed as illustrated in FIG. 4.

Figure 5:
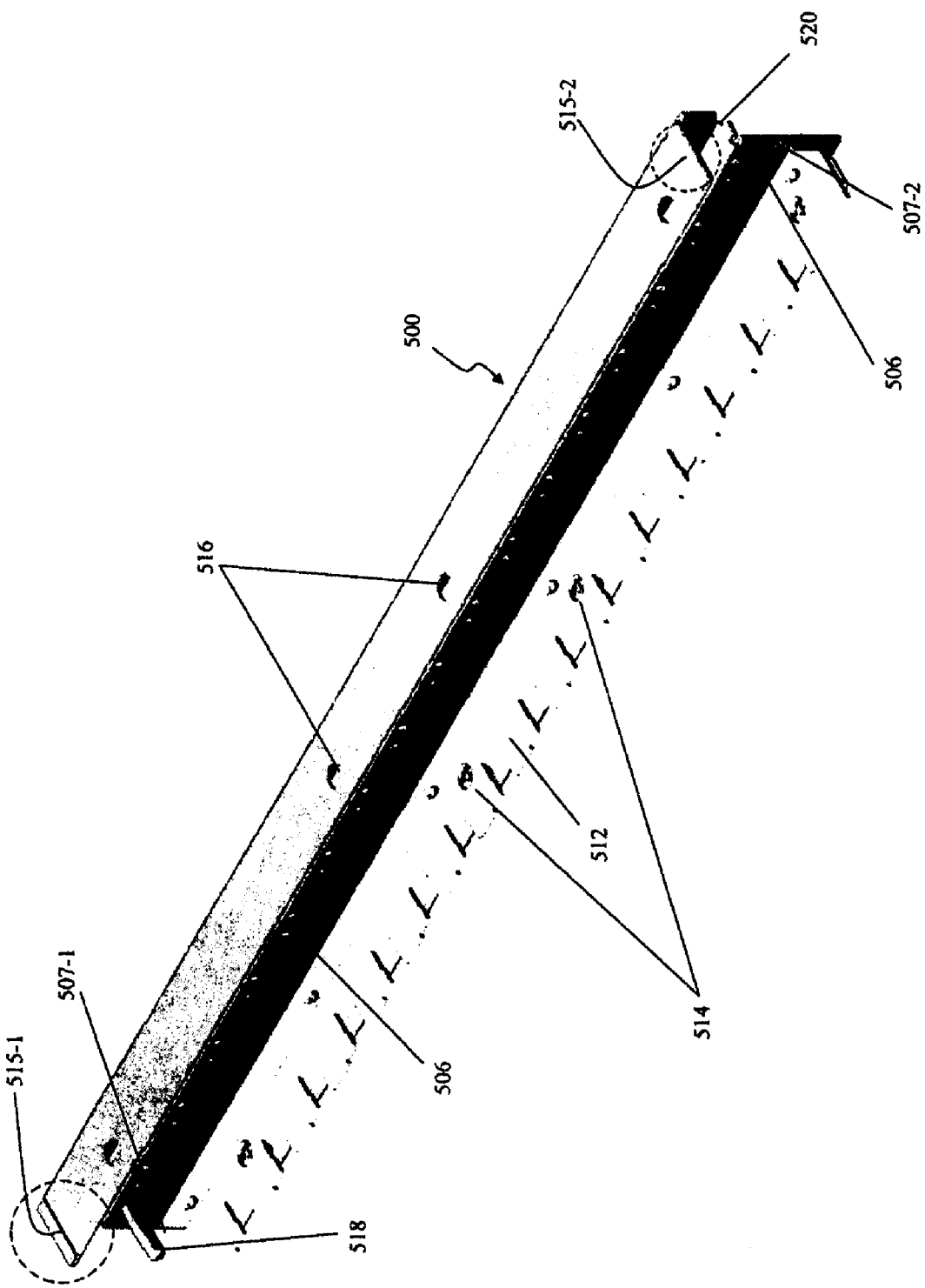
FIG. 5 is a perspective view of another embodiment of the present invention.

FIG. 5 is an illustration of yet another embodiment of a cable routing telecommunications frame generally shown at 500 according to the teachings of the present invention. Frame 500 includes mounting plate 506 attached to bottom plate 512. Mounting plate 506 is also attached to cable tunnel 520. Mounting plate 506 also includes peg 518 whose function is similar hooks 410. In one embodiment, bottom plate 512 contains screw holes or mounting apertures 514-1 to 514-N for attachment to an enclosure housing communication cables. Cable tunnel 520 also includes access apertures 516-1 to 516-N directly above screw holes 514-1 to 514-N. The access apertures 516-1 to 516-N allow access to the screw holes to aid in the attachment of the cable routing frame 500 to a telecommunications chassis or the like.

In operation, cable tunnel 520 routes cables brought up from a telecommunications chassis or the like to the ends 515-1, 515-2, 507-1 and 507-2 of cable routing frame 500. The cables are then to be managed to the back end of a telecommunications chassis and on to telecommunication racks or the like. Peg 518 support and route cables in space limited locations. Cable tunnel 520 and mounting plate 506 also hem at the exposed edges 515-1, 515-2, seen circled in FIG. 5. These hems prevent sharp edges from contacting the cables as well as protect workers who route the cables through cable routing casing 500.

A number of embodiments of the invention defined by the following claims have been described. Nevertheless, it will be understood that various modifications to the described embodiments may be made without departing from the scope of the claimed invention. Accordingly, other embodiments are within the scope of the following claims.

What is claimed is:

1. A system for managing and routing one or more data cables, the system comprising:
    a telecommunications enclosure having an external surface, wherein the telecommunications enclosure is adapted to house at least one or more data cables;
    a cable routing station coupled to the external surface of the telecommunications enclosure, the cable routing station adapted to selectively route at least one of the one or more data cables out of the telecommunications enclosure, wherein the route provides a bend radius for the at least one of the one or more data cables within a predetermined standard; and
    wherein the cable routing station comprises,
        a rear face having a front surface and a first edge extending along a length of the front surface,
        a bottom plate extending from the first edge of the rear face at a select angle from the front surface of the rear face,
        a plurality of cable routing clips coupled to the front surface of the rear face, adapted to route the one or more data cables in a select direction, and
        wherein the cable routing clips rotate around an axis perpendicular to the rear face.

2. The system of claim 1 wherein at least one of the data cables is an optical fiber.

3. The system of claim 1, wherein the telecommunications enclosure has a top end and front end, and further wherein the cable routing station is coupled to the top end of the telecommunications enclosure and proximately adjacent to the front end of the telecommunications enclosure.

4. The cable routing station of claim 1, wherein at least one of the one or more data cables is an optical fiber.

5. The cable routing station of claim 1, wherein at least one cable routing clip is positioned a select distance from another of the at least one cable routing clip.

6. A cable routing station comprising:
    a telecommunications enclosure having an external surface, wherein the telecommunications enclosure is adapted to house at least one or more cables;
    a cable routing station coupled to the external surface of the telecommunications enclosure, the cable routing station adapted to selectively route at least one of the one or more data cables out of the telecommunications enclosure, wherein the route provides a bend radius for the at least one of the one or more data cables within a predetermined standard; and
    wherein the cable routing station comprises;
        a rear face having a front surface and a first edge extending along a length of the front surface,
        a bottom plate extending from the first edge of the rear face at a select angle from the front surface of the rear face,
        a plurality of cable routing clips coupled to the front surface of the rear face adapted to route the one or more data cables in a select direction,
    one or more long cable routing clips adapted to guide data cables into the cable routing station; and
    one or more eyebrows, each eyebrow being coupled to the front surface of the rear face, each eyebrow having an engaging surface that has a bend radius along its length that is within the standard bend radius for optical fibers, wherein data cables abutting the eyebrow conform to the bend radius.

7. The cable routing station of claim 1, wherein the rear face includes two ends, the rear face being curved adjacent the ends.

8. The cable routing station of claim 1, wherein the rear face has exposed edges, further wherein the exposed edges of the rear face are hemmed.

9. The cable routing station of claim 1, further comprising:
    a plurality of fasteners attached to bottom plate.

10. The cable routing station of claim 1, further comprising:
    one or more long cable routing clips, wherein each long cable routing clip is coupled to the front surface of the mounting plate and is adapted to guide the one or more data cables to the cable routing system.

11. The cable routing station of claim 10, wherein the long cable routing clips rotate around an axis perpendicular to the rear face.

12. The cable routing station of claim 10, wherein at least one long cable routing clip is positioned a select distance from another of the at least one long cable routing clip.

13. A cable routing station comprising:
a telecommunications enclosure having an external surface, wherein the telecommunication enclosure is adapted to house at least one or more data cables;
a cable routing station coupled to the external surface of the telecommunications enclosure, the cable routing station adapted to selectively route at least one of the one or more data cables out of the telecommunications enclosure, wherein the route provides a bend radius for the at least one of the one or more data cables within a predetermined standard; and
wherein the cable routing station comprises,
a rear face having a front surface and a first edge extending alone a length of the front surface,
a bottom plate extending from the first edge of the rear face at a select angle from the front surface of the rear face,
a plurality of cable routing clips coupled to the front surface of the rear face adapted to route the one or more data cables in a select direction; and
one or more eyebrows, each eyebrow is coupled to the front surface of the rear face, one or more, each eyebrow having an engaging surface adapted to abut at least one of the one or more data cables.

14. The cable routing station of claim 13, wherein the engaging surface of each eyebrow has a select bend radius that extends along the length of the engaging surface, wherein a section of data cable abutting the engaging surface substantially conforms to the bend radius of the engaging surface.

15. The cable routing station of claim 13, wherein the bend radius of the engaging surface is within the standard bend radius for optical fibers.

16. The cable routing station of claim 13, wherein the eyebrows have exposed edges, the exposed edges being hemed.

17. A cable routing station comprising:
a telecommunications enclosure having an external surface, wherein the telecommunications enclosure is adapted to house at least one or more data cables
a cable routine station coupled to the external surface of the telecommunications enclosure, the cable routing station adapted to selectively route at least one of the one or more data cables out of the telecommunications enclosure, wherein the route provides a bend radius for the at least one of the one or more data cables within a predetermined standard; and
wherein the cable routing station comprises,
a rear face, having a front surface and a first edge extending alone a length of the front surface,
a bottom plate extending from the first edge of the rear face at a select angle from the front surface of the rear face,
a plurality of cable routing clips coupled to the front surface of the rear face adapted to route the one or more data cables in a select direction;
a mounting plate having a front surface and a first and second edge;
a bottom plate coupled to the mounting plate extending along the length of the front surface proximate the first edge;
at least one hook coupled to the front surface of the mounting plate proximate the second edge of the mounting plate;
at least one cable hinge holder coupled to the bottom plate; and
wherein the at least one closed cable hinge holder and the at least one hook are adapted to route data cables in a select direction.

18. The cable routing station of claim 17, wherein the bottom plate has at least one mounting aperture.

19. The cable routing station of claim 17, further comprising:
a cable tunnel adapted to route multiple data cables, the cable tunnel coupled to the second edge of the mounting plate.

20. The cable routing station of claim 17, wherein the cable tunnel has exposed edges, the exposed edges of the cable tunnel being hemmed.

21. The cable routing station of claim 17, wherein the top surface of cable tunnel contain at least one access aperture.

22. The cable routing station of claim 17, wherein the mounting plate has exposed edges, the exposed edges of the mounting plate being hemmed.

23. A cable routing station for managing and routing one or more data cables, the cable routing station comprising:
a rear face having a front surface and a first edge extending along the length of the front surface;
a bottom plate extending from the first edge of the rear face at a select angle from the front surface of the rear face;
a plurality of cable routing clips coupled to the front surface of the rear face adapted to route data cables in a select direction; and
one or more long cable routing clips, wherein each long cable routing clip is coupled to the front surface of the mounting plate and is adapted to guide data cables into the cable routing system, wherein the long cable routing clips rotate around an axis perpendicular to the rear face.

24. The cable routing station of claim 23, wherein at least one data cable is an optical fiber.

25. The cable routing station of claim 23, wherein the cable routing clips rotate around an axis perpendicular to the rear face.

26. The cable routing station of claim 23, wherein at least one cable routing clip is positioned a select distance from another of the at least one cable routing clip.

27. The cable routing station of claim 23, wherein the rear face includes two ends, the rear face being curved adjacent the ends.

28. The cable routing station of claim 23, wherein the rear face has exposed edges, further wherein the exposed edges of the rear face are hemmed.

29. The cable routing station of claim 23, further comprising:
a plurality of fasteners attached to bottom plate.

30. The cable routing station of claim 23, wherein at least one long cable routing clip is positioned a select distance from another of the at least one long cable routing clip.

31. A cable routing station for managing and routing one or more data cables, the cable routing station comprising:
a rear face having a front surface and a first edge extending along the length of the front surface;
a bottom plate extending from the first edge of the rear face at a select angle from the front surface of the rear face;

a plurality of cable routing clips coupled to the front surface of the rear face adapted to route data cables in a select direction;

one or more long cable routing clips adapted to guide data cables into the cable routing system; and one or more eyebrows, each eyebrow being coupled to the from surface of the rear face, each eyebrow having an engaging surface that has a bend radius along its length that is within the standard bend radius for optical fibers, wherein data cables abutting the eyebrow conform to the bend radius.

32. A cable routine station for managing and routine one or more data cables, the cable routing station comprising:

a rear face having a front surface and a first edge extending along the length of the front surface;

a bottom plate extending from the first edge of the rear face at a select angle from the front surface of the rear face;

a plurality of cable routine clips coupled to the front surface of the rear face adapted to route data cables in a select direction; and one or more eyebrows, each eyebrow coupling to the front surface of the rear face and moreover, each eyebrow having an engaging surface adapted to abut one or more data cables.

33. The cable routing station of claim 32, wherein the engaging surface of each eyebrow has a select bend radius that extends along the length of the engaging surface, wherein a section of data cable abutting the engaging surface substantially conforms to the bend radius of the engaging surface.

34. The cable routing station of claim 32, wherein the bend radius of the engaging surface is within the standard bend radius for optical fibers.

35. The cable routing station of claim 32, wherein the eyebrows have exposed edges, the exposed edges being hemmed.

36. A cable routing station for managing and routing one or more data cables, the cable routing station comprising:

a mounting plate having a front surface and a first edge extending along the length of the front surface;

one or more long cable routing clips, wherein each long cable routing clip is coupled to the front surface of the mounting plate and is adapted to guide data cables to the cable routing system; and one or more eyebrows, each eyebrow having an engaging surface that has a select radius along a length of the engaging surface, each eyebrow is coupled to the front surface of the mounting plate, wherein data cables routed abut the engaging surface of an associated eyebrow substantially conform to the bend radius of the eyebrow.

37. The cable routing station of claim 36, wherein each eyebrow is adapted to bend data cables within the standard bend radius for optical fibers.

38. The cable routing station of claim 36, wherein at least one data cable is an optical fiber.

39. The cable routing station of claim 36, wherein at least one of the one or more long cable routing clips rotate around an axis perpendicular to the rear face.

40. The cable routing station of claim 36, wherein at least one long cable routing clips is positioned a select distance from another of the at least one long cable routing clip.

41. The cable routing station of claim 36, further comprising:

one or more cable routing clips coupled to the front surface of the mounting plate, the one or more cable routing clips are adapted to route the data cables in a select direction.

42. The cable routing station of claim 36, wherein the mounting plate includes two ends, the mounting plate being curved to guide data cables adjacent the two ends.

43. The cable routing station of claim 36, wherein the eyebrows have exposed edges, wherein the exposed edges are hemmed.

44. The cable routing station of claim 41, wherein at least one of the one or more cable routing clips rotate around an axis perpendicular to the rear face.

45. The cable routing station of claim 41, wherein at least one cable routing clip is positioned a select distance from another of the at least one cable routing clip.

46. A cable routing station for managing and routing one to many data cables, the cable routing station comprising:

a mounting plate having a front surface and a first and second edge;

a bottom plate coupled to the mounting plate extending along the length of the front surface proximate the first edge;

at least one hook coupled to the front surface of the mounting plate proximate the second edge of the mounting plate;

at least one cable hinge holder coupled to the bottom plate; and wherein the at least one closed cable hinge holder and the at least one hook are adapted to route data cables in a select direction.

47. The cable routing station of claim 46, wherein at least one of the data cables is an optical fiber.

48. The cable routing station of claim 46, wherein the bottom plate has at least one mounting aperture.

49. The cable routing station of claim 46, wherein the mounting plate has exposed edges, the exposed edges of the mounting plate being hemmed.

50. The cable routing station of claim 46, further comprising:

a cable tunnel adapted to route multiple data cables, the cable tunnel coupled to the second edge of the mounting plate.

51. The cable routing station of claim 50, wherein the cable tunnel has exposed edges, the exposed edges of the cable tunnel being hemmed.

52. The cable routing station of claim 50, wherein the top surface of cable tunnel contains at least one access aperture.

53. A method of managing data cables in a telecommunication system, the method comprising:

routing data cables housed in a telecommunication chassis out of the chassis;

routing the data cables routed out of the chassis into a cable routing station attached to the chassis; and abutting each data cable on an engagement surface of an associated eyebrow, wherein each data cable will have a bend radius substantially the same as the bend radius of the engagement surface of the associated eyebrow.

54. The method of claim 53, further comprising:

routing each data cable through associated cable routing clips in the cable routing station.

55. The method of claim 53, further comprising:

hemming exposed ends of the cable routing station.

56. A method of managing data cables in a telecommunication system, the method comprising:

routing data cables housed in a telecommunication chassis out of the chassis;

routing the data cables routed out of the chassis into a cable routing station attached to the chassis;

routing each data cable through an associated cable hinge holder; and routing each data cable around and engagement surface of an associated hook, wherein the engagement surface of the hook has a select bend radius.

57. A system for managing and routing one or more data cables, the system comprising:

a telecommunications enclosure having an external surface, wherein the telecommunications enclosure is adapted to receive one or more data cables; and a cable routing station including, a bottom plate adapted to be coupled to an external surface of the telecommunication enclosure, a rear plate extending generally perpendicular from an edge of the bottom plate and away from the external surface of the telecommunication housing, one or more cable guides coupled to the rear plate adapted to route the one or more data cables in a non-damaging fashion;

wherein the one of more cable guides further comprises;

one or more hooks adapted to route the one or more data cables is a select direction: and one or more cable hinge holders, each cable hinge holder adapted to direct an associated data cable to an associated hook.

58. The system of claim 57, wherein the one or more cable guides are cable routing clips adapted to route the one or more data cables is a select direction.

59. The system of claim 57, further comprising:

a cable channel adapted to guide the one or more data cables is a select direction, the cable channel coupled along the rear plate.

60. The system of claim 57, wherein the one or more cable guides further comprises:

a peg.

61. A cable routing station for managing and routing one or more data cables, the cable routing station comprising:

a rear face having a front surface and a first edge extending along the length of the front surface;

a bottom plate extending from the first edge of the rear face at a select angle from the front surface of the rear face;

a plurality of cable routing clips coupled to the front surface of the rear face adapted to route data cables in a select direction;

one or more long cable routing clips adapted to guide data cables into the cable routing system; and one or more eyebrows, each eyebrow being coupled to the front surface of the rear face, each eyebrow having an engaging surface that has a bend radius along its length that is within the standard band radius for optical fibers, wherein the one or more eyebrows are adapted such that data cables abutting each eyebrow conform to the bend radius.

62. A cable routing station for managing and routing one to many data cable, the cable routing station comprising:

a mounting plate having a front surface and a first and second edge;

a bottom plate coupled to the mounting plate extending along the length of the front surface proximate the first edge;

at least one hook coupled to the front surface of the mounting plate proximate the second edge of the mounting plate; at least one cable hinge holder coupled to the bottom plate, wherein the at least one closed cable hinge holder and the at least one hook are adapted to route data cables in a select direction; and a cable tunnel adapted to route multiple data cables, the cable tunnel coupled to the second edge of the mounting plate.

* * * * *

UNITED STATES PATENT AND TRADEMARK OFFICE
CERTIFICATE OF CORRECTION

| | |
|---|---|
| PATENT NO. | : 6,954,577 B2 |
| APPLICATION NO. | : 10/626933 |
| DATED | : October 11, 2005 |
| INVENTOR(S) | : Kohan |

Page 1 of 1

It is certified that error appears in the above-identified patent and that said Letters Patent is hereby corrected as shown below:

At Claim 17, Column 7, Line 56, replace the first occurrence of the word "alone" with --along--

At Claim 61, Column 12, Line 17, replace the first occurrence of the word "band" with --bend--

Signed and Sealed this

Twenty-fifth Day of November, 2008

JON W. DUDAS
*Director of the United States Patent and Trademark Office*